(12) United States Patent
Dickinson et al.

(10) Patent No.: US 9,088,897 B2
(45) Date of Patent: Jul. 21, 2015

(54) SYSTEM AND METHOD OF DUAL NETWORK WITH A SHARED BASE

(75) Inventors: Steven Dickinson, Edinburgh (GB); Otmar Rengert, Nürnberg (DE); Jochen Kilian, Rothenburg ob der Tauber (DE); Eli Fogel, Herzeliya (IL)

(73) Assignee: DSP GROUP LTD., Herzliya (IL)

( * ) Notice: Subject to any disclaimer, the term of this patent is extended or adjusted under 35 U.S.C. 154(b) by 226 days.

(21) Appl. No.: 13/361,973

(22) Filed: Jan. 31, 2012

(65) Prior Publication Data

US 2012/0202484 A1    Aug. 9, 2012

Related U.S. Application Data

(60) Provisional application No. 61/439,946, filed on Feb. 7, 2011.

(51) Int. Cl.
*H04W 16/14* (2009.01)
*H04W 84/16* (2009.01)
*H04W 88/10* (2009.01)

(52) U.S. Cl.
CPC .............. *H04W 16/14* (2013.01); *H04W 84/16* (2013.01); *H04W 88/10* (2013.01)

(58) Field of Classification Search
CPC ..... H04W 88/06; H04W 84/18; H04W 16/14; H04W 4/008; H04W 56/00; H04W 56/001; H04W 84/16; H04W 88/10; H04M 1/6091; H04M 2250/02; H04M 1/6041; H04M 1/725; H04M 2250/08; H04M 3/42246; H04M 1/72505; H04M 1/72519
USPC ......... 370/346, 349, 350, 442, 449, 450, 454, 370/458, 470, 471, 473, 503, 508, 509, 510, 370/511, 512, 513, 514, 273, 280, 294, 337, 370/338, 347; 455/41.1, 41.2, 426.1, 426.2, 455/462, 465, 502, 508
See application file for complete search history.

(56) References Cited

U.S. PATENT DOCUMENTS

| | | | |
|---|---|---|---|
| 2005/0181823 A1* | 8/2005 | Haartsen | 455/553.1 |
| 2005/0197061 A1* | 9/2005 | Hundal | 455/41.2 |
| 2008/0008510 A1* | 1/2008 | Lee et al. | 399/411 |
| 2009/0168763 A1* | 7/2009 | Choi | 370/352 |
| 2009/0180464 A1* | 7/2009 | Walley et al. | 370/350 |
| 2011/0111764 A1* | 5/2011 | Mueck et al. | 455/452.1 |

FOREIGN PATENT DOCUMENTS

WO    WO 01/30108 A1 *   4/2001   ............... H04Q 7/38

* cited by examiner

*Primary Examiner* — Dinh P Nguyen
(74) *Attorney, Agent, or Firm* — Reches Patents

(57) ABSTRACT

An apparatus for enabling operation of a LDC network within a DECT system having a modified protocol, comprising an A-field with an identity of a FP shared by both the DECT system and the LDC network, B-fields with unique sync patterns for the DECT system and the LDC network, respectively; and separate dummy bearers for transmission by the FP for the DECT system and the LDC network, respectively, and a method for using the same.

22 Claims, 3 Drawing Sheets

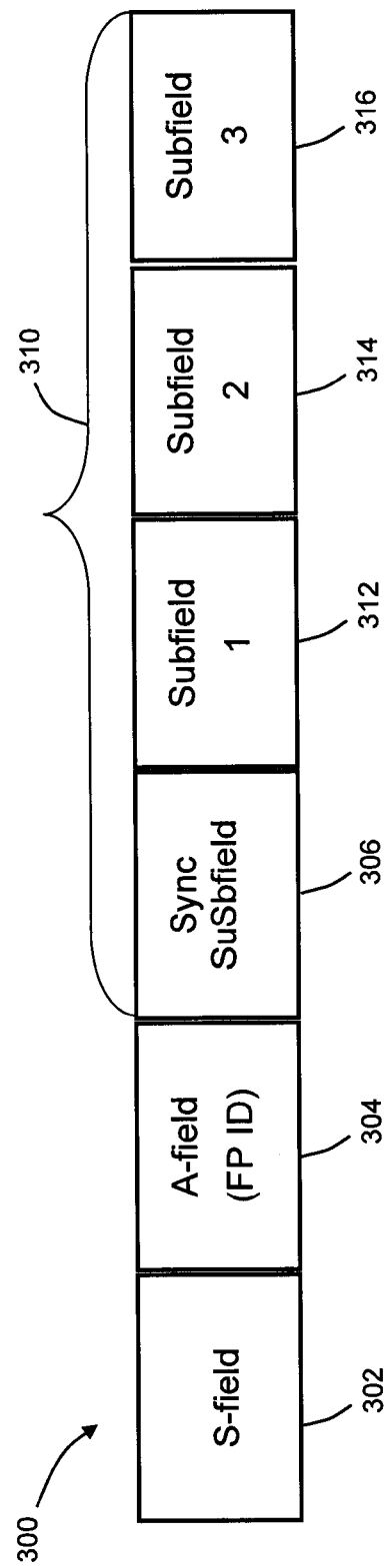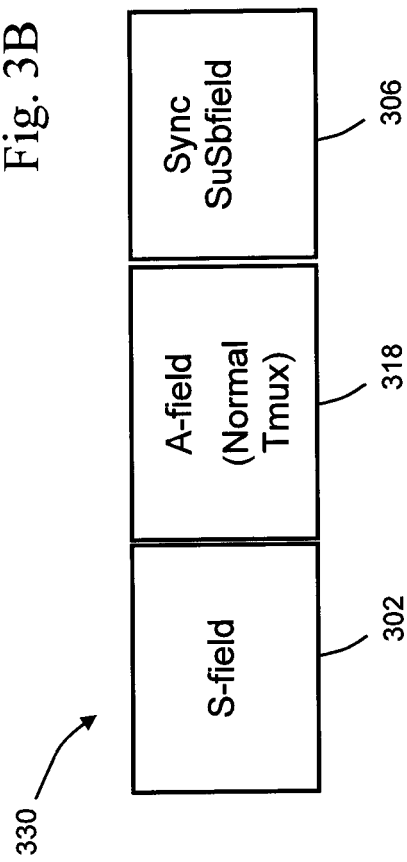

SYSTEM AND METHOD OF DUAL NETWORK WITH A SHARED BASE

BACKGROUND

The present disclosure generally relates to a plurality of co-operating networks, and more specifically to cooperating networks sharing a common fixed part.

A cordless telephony network, such as a DECT system, and a sensor/actuator network, such as Zigbee, also known as low-duty-cycle network (LDC), are different, having separate protocols, air interfaces and characteristics.

Thus, interfacing the LDC network with the cordless telephony to enable access to external networks such as via PSTN or the WEB, requires duplicating the fixed parts of each network and bridging the two networks. This, also for controlling or presenting status and alerts of the LDC network on the cordless handsets.

Generally, an LDC network differentiates from a cordless telephony system, by one or more of the following LDC devices:
 The data packets transmitted by the LDC devices are very short;
 The duty cycle of communication relative to idle-time in LDC devices is very small, at least as compared with a cordless telephony network,
 There is a requirement for longer battery life (such as years) in LDC devices.

There is therefore a need to provide a system and method for expanding the cordless telephony network to support the standard cordless functionality simultaneously with the LDC network.

SUMMARY

Without limiting, the present disclosure relates to DECT using a ETSI-DECT protocol as a representative of a cordless telephone system, without precluding other cordless telephone systems and networks, WiFi based networks, Femotocell based cellular networks and the like.

Likewise, without limiting, the present disclosure relates to Zigbee as a LDC network, without precluding other LDC networks or devices.

One problem solved by the present subject matter is how to extend the cordless air interface and protocols to support additional LDC network or networks.

As used herein, without limiting, the term 'FP' denotes a fixed part of a cordless telephone system such as a base of a DECT system, and the term 'PP' denotes a portable part of a cordless telephone system such as a handset of a DECT system.

One exemplary embodiment of the disclosed subject matter is an apparatus for enabling operation of a LDC network within a DECT system having a modified protocol, comprising:
 an A-field with an identity of a FP shared by both the DECT system and the LDC network;
 B-fields with unique sync patterns for the DECT system and the LDC network, respectively; and
 separate dummy bearers for transmission by the FP for the DECT system and the LDC network, respectively.

Another exemplary embodiment of the disclosed subject matter is a method for extending the protocol of a DECT system to enable operation of a LDC network within a DECT system, comprising:
 assigning unique sync patterns in B-fields for the DECT system and the LDC network, respectively; and
 transmitting by the FP different dummy bearers for the DECT system and the LDC network, respectively.

Yet another exemplary embodiment of the disclosed subject matter is a method for accommodating a LDC network within a cordless telephone system, the method comprising providing within the air interface of the cordless telephone system a communication between a fixed part of the cordless telephone system and a unit of the LDC network.

Yet another exemplary embodiment of the disclosed subject matter is an apparatus for accommodating a LDC network within a cordless telephone system, comprising:
 an at least one unit of the cordless telephone system;
 an at least one unit of the LDC network; and
 a fixed part shared by the cordless telephone system and the LDC network for communicating with the at least one unit of the cordless telephone system and the at least one unit of the LDC network.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

Figure 1:
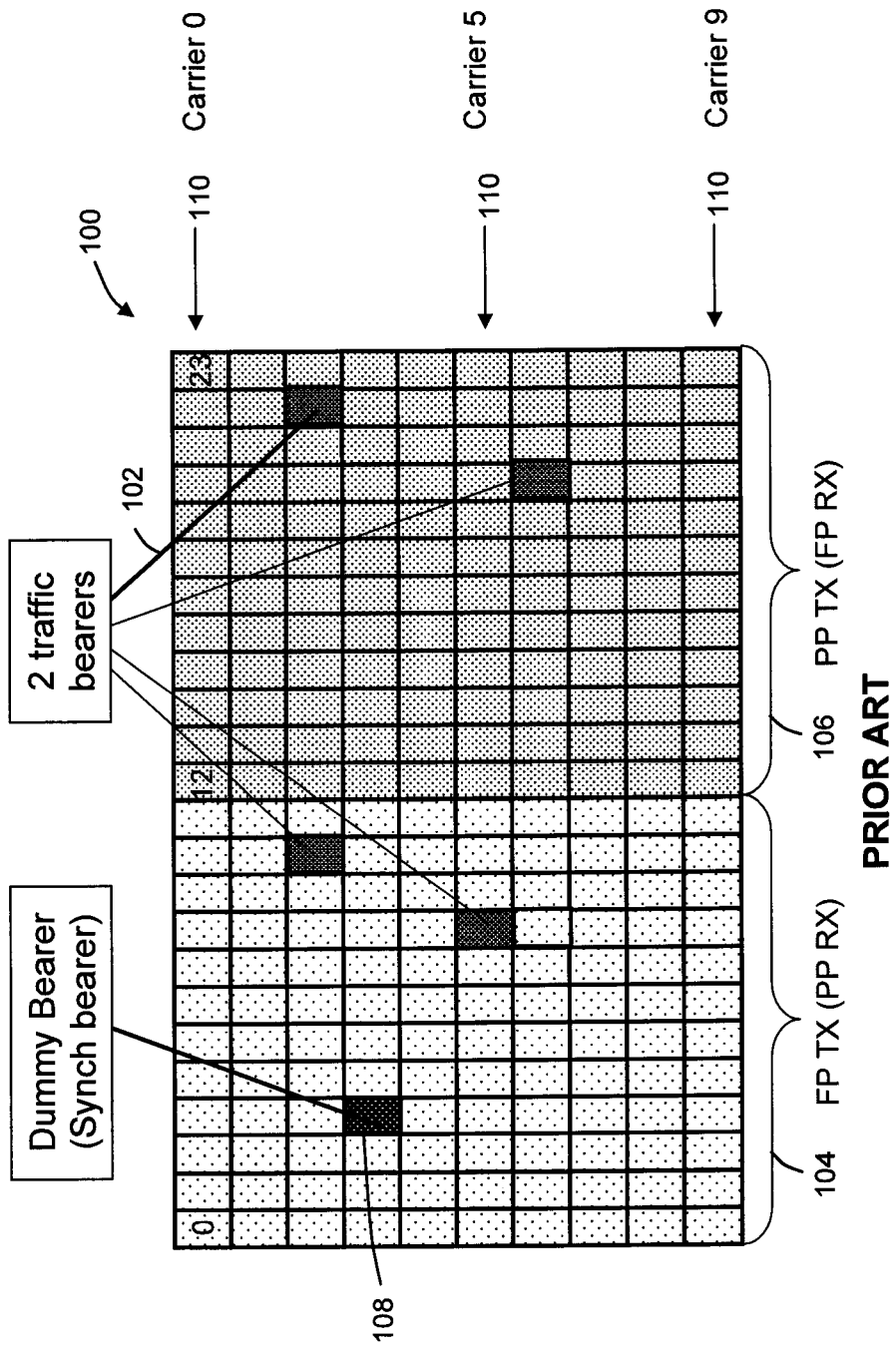
Figure 2:
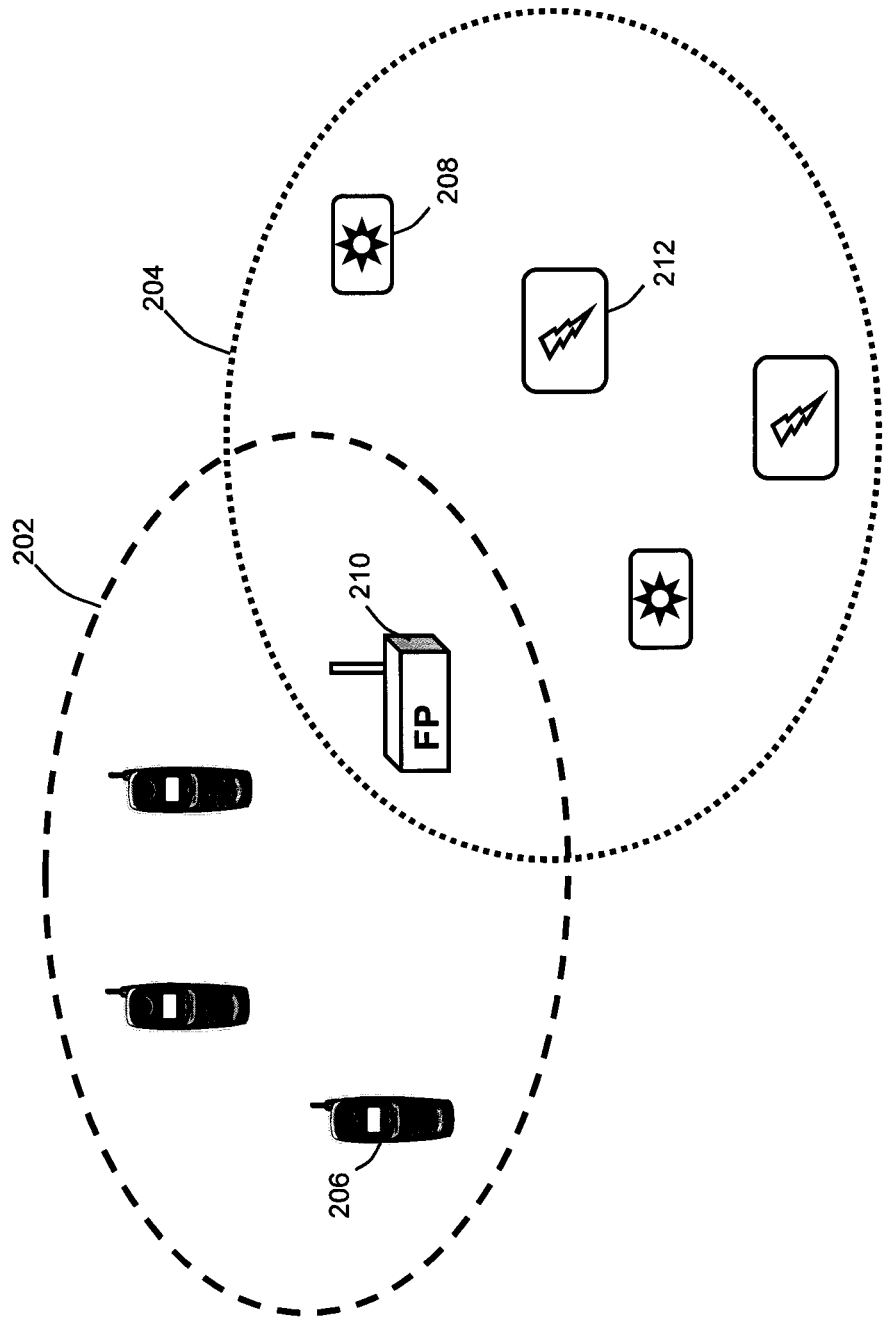

FIG. 1 schematically illustrates a representative DECT frame;

FIG. 2 schematically illustrates a cordless telephone system and LDC network sharing a common base, according to exemplary embodiments of the disclosed subject matter;

FIG. 3A schematically illustrates a dummy bearer of a LDC network, according to exemplary embodiments of the disclosed subject matter; and FIG. 3B schematically illustrates a NEMO dummy bearer, according to exemplary embodiments of the disclosed subject matter.

DETAILED DESCRIPTION

A general technical problem dealt by the disclosed subject matter is wirelessly communicating by a cordless telephone system an apparatus having a different communications regime than the cordless telephone system.

One technical problem dealt by the disclosed subject matter is wirelessly communicating by a cordless telephone system with an apparatus having a different communications regime than the cordless telephone system, using the fixed part, or base, of the cordless telephone system for both the cordless telephone system and the apparatus.

The apparatus comprises one or more units or elements of another wireless system or network different from the cordless telephone system, for example, a control system with sensors and/or actuators such as Zigbee.

The cordless telephone system is a DECT system, without precluding other cordless or wireless systems.

One technical solution according to the disclosed subject matter is a cordless telephone system such as DECT with a modified protocol to accommodate communications with the apparatus.

In some embodiments, the synchronization ('sync') field of the cordless telephone system protocol is modified allowing the cordless telephone system and the apparatus to operate parallelly yet separately on or according to different channels such as different beacons and/or bearers and/or carriers of the fixed part of the cordless telephone system. Optionally, other fields of the protocol are used and/or modified to allow the co-existence and co-operation of the communications of the cordless telephone system and the apparatus by or using the base of the cordless telephone system.

Accordingly, the other wireless system or network shares a link time and carriers with the cordless telephone system, forming logically, or virtually, separated networks.

In some embodiments, the apparatus is or a part of a plurality of wireless systems.

Thus, the cordless telephone system and the other wireless systems or systems are combined in the air interface and/or communications protocol of the cordless telephone system, sharing or using the base of the cordless telephone system as a communication hub with which the apparatus of the wireless systems or systems and the handsets or other portable parts of the cordless telephone system communicate.

A potential technical effect of the disclosed subject matter is a cordless telephone system that accommodates other wireless system or systems within the air interface and/or communications protocol of the cordless telephone system using the fixed part of the cordless telephone system for all the communications of all the systems.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Below is brief general non-limiting overview of some aspects of a DECT telephone system, providing a reference for the following description.

The DECT air interface is based on TDMA/FDD regime as follows. The basic TDMA frame (10 mS) is split into 24 slots, 12 of which (5 mS) are normally allocated for down link communications (FP to PP) and 12 slots for uplink communications (PP to FP). In addition to the 24 slots based frame, the cordless telephone system has at its disposal few frequency bands, where each band can be used at any time provided communication in a band does not interfere with or by another system. The combination of a slot at a specific frequency is referred to as a bearer. One of the bearers is selected by the FP as a beacon denoted also as a dummy bearer. The dummy bearer is used for tasks such as synchronizing the cordless telephone system, for broadcasting messages from the FP to the PP and for call control aspects and allows for some data transfers with lower contents relative to regular communication. In a normal mode, the FP transmits every frame the dummy bearer thereof for the tasks as described above.

DECT also provides a low radiation mode, referred also as No Emission Mode or NEMO. In the NEMO mode, when the cordless telephone system is idle, that is no calls are active or pending, the FP does not transmit the dummy bearer and thus the system synchronization is lost. Both FP and PP keep alert, that is, listening or Rx open, to signaling to be transmitted by the other party for returning to normal mode. The FP or PP, depending on call initiator, transmits special signal which enable fast and reliable synchronization of the other side, whence the FP returns to normal mode.

FIG. 1 schematically illustrates a frame 100 representative of a DECT frame. Frame 100 includes 10 of a carrier frequency 110 divided into 12 FP transmit bearers denoted as 104 and 12 PP transmit bearers denoted 106, where a plurality of a bearer denoted as 102 illustrate two of a traffic bearer and a bearer denoted as 108 illustrates a dummy bearer, also denoted as a sync bearer.

FIG. 2 schematically illustrates a LDC network 204 sharing a base 210 of a cordless telephone system 202 as a common or a shared fixed part (FP), according to exemplary embodiments of the disclosed subject matter.

In some embodiments, cordless telephone system 202 is a DECT system whereas, in some embodiments, LDC network 204 is a Zigbee system.

Cordless telephone system 202 comprises one or more of handset 206, representing any number of handset 206 as portable parts of cordless telephone system 202. Handset 206 is also referred to as a cordless telephone system unit.

LDC network 204 comprises one or more of sensor 208 and/or one or more of actuator 212, collectively referred to also as one or more of a LDC unit.

The LDC unit is communicable or in communication with base 210, sharing base 210 with cordless telephone system 202. For example, sensor 208 sends messages to base 210 upon a sensed event and/or on timely basis such as periodically or upon a lapse of a time interval. And as another example, actuator 212 receives or may receive messages from base 210 to execute certain action and/or report certain status data.

In some embodiments of the present disclosure, base 210 of cordless telephone system 202 and associated air interface and/or communications protocol are used to accommodate also LDC network 204. For example, providing communications between base 210 and a LDC unit within the framework of air interface and/or communications protocol of cordless telephone system 202.

As cordless telephone system 202 operates according to a standard common interface such as DECT, LDC network 204 operates within the standard's constraints, thereby maintaining compatibility with the characteristics, such as TDMA/FDD, of cordless telephone system 202.

In some embodiments, in addition to a standard dummy bearer of DECT, the FP transmits on a different bearer used as a dummy bearer of LDC network 204. In some embodiments, the dummy bearer of LDC network 204 is constructed such as to enable sufficiently fast synchronization with one or more of the LDC units.

In some embodiments, the dummy bearer of LDC network 204 uses a different time slot on the same or a different frequency with respect to the standard dummy bearer of DECT.

FIG. 3 schematically illustrates a dummy bearer 300 of a LDC network, according to exemplary embodiments of the disclosed subject matter;

Dummy bearer 300 comprises:

A unique sync pattern as s-field 302, as compared to a normal DECT FP transmission.

An A-field 304 that contains the FP identity.

A B-field 310 that contains 4 subfields such as each of 80-bits, namely, 64 data bits and 16 bit CRC.

Where:

A first subfield—a Sync Subfield 306 of B-field 310—contains the Sync Subfield;

and the remaining three B-field subfields—subfield 312, subfield 314 and subfield 316—contain additional data for broadcasting and/or device specific messages In some embodiments, in order to separate cordless telephone system 202 and LDC network 204 and support the respective characteristics of each network while operating within the framework of air interface and/or communications protocol of cordless telephone system 202, each of cordless telephone system 202 and LDC network 204 use specific different sync patterns.

Thus, assigning a unique sync pattern to each network, the pattern of one network different from the pattern of the other network, enables the different networks to co-exist and operate without confusion. Optionally or additionally, using different sync patterns enables each network to be in a different mode relative to the other, for example, one network remains in NEMO mode while the other network is awake.

In some embodiments, using specific sync patterns for each network prevents, or potentially prevents, a LDC unit from locking to or on any bearer of an FP other than the bearer of the LDC network, and likewise, prevents, or potentially prevents, a PP from locking to or on any bearer of the FP other than the standard bearer thereof.

In some embodiments, using specific sync patterns for each network provides for or enables to find the bearer of the LDC network at a first attempt, reducing the time required for locking on the bearer.

In some embodiments, the transmissions of the dummy bearers of the LDC network and the cordless telephone system operate independently, that is, while the dummy bearer of the cordless telephone system is either transmitting every frame or does not transmit not at all (NEMO mode), the dummy bearer of the LDC network may be transmitted at every frame or every several frames. Optionally or alternatively, the dummy bearer of the LDC network may be transmitted in any arbitrary time sequence or not transmitted at all (LDC network—NEMO) as is appropriate per the latencies requirements of the LDC network.

In some embodiments of the present disclosure, dummy bearer 300 broadcasts on a 'preferred carrier'.

In some embodiments, the FP chooses a preferred carrier for a dummy bearer of the LDC network. Optionally, the preferred carrier is chosen at random, where, optionally or alternatively, the preferred carrier is obtained from pre-scan of RSSI levels on all carriers.

Thus, in some embodiments, the FP performs RSSI scanning on the dummy bearer of the LDC network in order to detect interference. If the FP detects interference then, in order to avoid the interference the FP can switch to another carrier.

Yet, in some embodiments, in order to increase the likelihood of the LDC units to synchronize sufficiently fast the dummy bearer of the LDC network should remain on the preferred carrier. In some embodiments, remaining on the preferred carrier is carried out by either moving to a different slot on the same carrier, or if necessary by moving to a different carrier temporarily and moving back to the preferred carrier once the interference has vanished.

In some embodiments, when a LDC unit requires or has to lock to the FP, the LDC unit will try the preferred carrier. Failing to acquire the preferred carrier then after a short time such as after a few frames, the FP will try scanning for other DECT carriers. Thus the majority of the time, the LDC unit is always expected to find the FP on the preferred carrier without having to try other carriers.

It is noted that the FP does not have to explicitly notify the LDC units what the preferred carrier is, as the LDC units can assume that the carrier currently in use for the LDC network dummy bearer is the preferred carrier.

According to the description above, in some embodiments, a plurality of LDC network 204 or other wireless systems are accommodated in the air interface and/or communications protocol according to the sync field and/or other fields.

In some embodiments, the LDC unit maintains a carrier history list, where, optionally, the carriers in the history list are used as the sequence of synchronization attempts.

In some embodiments, the newest carrier is added at the top of the list, where, optionally, the sequence of synchronization attempts is in a top to bottom manner with respect to the history list.

It is noted that there could be differences or variations in using the carrier history list.

In some embodiments, in order to support the LDC network-NEMO mode the FP is allowed to shut off the respective dummy bearer of the LDC network, optionally accompanied by broadcasting shutting-off status on the dummy bearer of the LDC network.

In some embodiments, the LDC unit switches to NEMO mode if the LDC unit has received a NEMO broadcasting message and/or the LDC unit fails to detect a dummy bearer of the LDC network within a determined or preset time or a sufficient time.

In some embodiments, while in LDC network-NEMO mode the FP and LDC units scan on a regular basis for wake up requests from other parties; namely, the LDC units scan the FP and/or the FP scans the LDC units for wakeup request.

FIG. 3B schematically illustrates a NEMO dummy bearer 330, according to exemplary embodiments of the disclosed subject matter.

S-field 302 and Sync Subfield 306 are similar to the S-field and Sync Subfield of dummy bearer 300, respectively, while A-field 308 contains the Formal time multiplexed information (Tmux) of DECT that can change for the cordless telephone system while maintained as constant for the LDC network.

It is noted that for normal dummy bearer only the first two fields, namely S-field 302 and A-field 308, are used.

We claim:

1. A fixed part that is non-transitory and is shared by a low-duty-cycle (LDC) network and a digital enhanced cordless telecommunication (DECT) system, wherein the fixed part is arranged to transmit dummy bearers of a same format to units of the LDC network and to units of the DECT system; wherein each dummy bearer comprises an A-field with an identity of the fixed part and a B-field having a sync pattern field; wherein a value of a unique sync pattern included in B-fields of dummy bearers aimed to units of the LDC network differs from a value of unique sync pattern included in B-fields of dummy bearers aimed to units of the DECT system.

2. The fixed point according to claim 1, wherein the fixed part is arranged to prevent from transmitting dummy bearers aimed to units of the DECT system when operating in a no emission mode (NEMO) mode for the DECT system.

3. A method for extending a protocol of a digital enhanced cordless telecommunication (DECT) system to enable operation of a low-duty-cycle (LDC) network within a DECT system, the method comprising: assigning different unique sync patterns in B-fields of dummy bearers for the DECT system and the LDC network, respectively; and transmitting by a fixed part that is non-transitory different dummy bearers of a same format for the DECT system and the LDC network, respectively; wherein each dummy bearer for the DECT system comprises a B-field that includes the unique sync pattern for the DECT system and wherein each dummy bearer for the LDC network comprises a B-field that includes the unique sync pattern for the LDC network; wherein the unique sync pattern for the LDC network differs from the unique sync pattern for the DECT system.

4. The method according to claim 3, further comprising extending the protocol of the DECT system to facilitate setting at least one of the DECT system or the LDC network in a no emission mode (NEMO) mode.

5. The method according to claim 4, further comprising setting both of the DECT system and the LDC network in a NEMO mode.

6. A method for accommodating a low-duty-cycle (LDC) network within a cordless telephone system, the method comprising providing within an air interface of the cordless telephone system a communication between a fixed part of the cordless telephone system and a unit of the LDC network; wherein the fixed part is non-transitory; wherein the providing of the communication comprises transmitting by the fixed part different dummy bearers of a same format for the cordless telephone system and the LDC network, respectively; wherein each dummy bearer for the cordless system comprises a B-field that includes a unique sync pattern for the cordless telephone system and wherein each dummy bearer for the LDC system comprises a B-field that includes the unique sync pattern for the LDC network ;wherein the unique sync pattern for the LDC network differs from the unique sync pattern for the cordless telephone system.

7. The method according to claim 6, wherein the cordless telephone system is a digital enhanced cordless telecommunication (DECT) system.

8. The method according to claim 7, wherein the providing within the air interface of the cordless telephone system comprises modifying the air interface of the cordless telephone system to share a link time and carriers between the LDC network and the DECT system, forming logically separated networks.

9. The method according to claim 3, comprising transmitting both A-field and B-fields only within the dummy bearers.

10. The apparatus according to claim 1 wherein the fixed part is arranged to transmit both A-field and B-fields only within the dummy bearers.

11. The method according to claim 6, further comprising extending a protocol of the cordless system to facilitate no emission mode (NEMO) Mode in each of the cordless telephone system and the LDC network.

12. The method according to claim 6, further allowing communicating at a preferred carrier by moving to another slot at the same carrier.

13. The method according to claim 6, further forming a history of recently used carriers in LDC units, thereby providing a sufficiently fast establishing of synchronization.

14. A fixed part that is non-transitory and is shared by a cordless telephone system and a low-duty-cycle (LDC) network; wherein the fixed part is arranged to transmit different dummy bearers of a same format for the cordless telephone system and the LDC network, respectively; wherein each dummy bearer for the cordless telephone system comprises a B-field that includes a unique sync pattern for the cordless telephone system and wherein each dummy bearer for the LDC network comprise a B-field that includes the unique sync pattern for the LDC network wherein the unique sync pattern for the LDC network differs from the unique sync pattern for the cordless telephone system.

15. The fixed part according to claim 14, wherein the air interface of the cordless telephone system is modified to accommodate communications of both the cordless telephone system and the LDC network.

16. The fixed part according to claim 14, wherein the cordless telephone system is a digital enhanced cordless telecommunication (DECT) system.

17. The fixed part according to claim 16, wherein the fixed part is a DECT base.

18. The fixed part according to claim 16, wherein the air interface of the cordless telephone system is modified so that the LDC network shares a link time and carriers with the DECT system, forming a logically separated network.

19. The fixed part according to claim 14 wherein the fixed part is arranged to transmit both A-field and B-fields only within the dummy bearers 20. The fixed part according to claim 19 wherein the cordless telephone system is a digital enhanced cordless telecommunication (DECT) system.

21. The fixed part -according to claim 15, wherein the air interface of the cordless telephone system is modified to provide a no emission mode (NEMO) Mode in each of the cordless telephone system and the LDC network.

22. The fixed part according to claim 15, wherein the air interface of the cordless telephone system is modified to allow communicating at a preferred carrier by moving to another slot at the same carrier.

* * * * *